United States Patent [19]

Eckel

[11] Patent Number: 5,197,843
[45] Date of Patent: Mar. 30, 1993

[54] DEVICE FOR LOADING AND UNLOADING UNITARY CARGO ONTO AND FROM SHIPS

[75] Inventor: Wilfried Eckel, Berlin, Fed. Rep. of Germany

[73] Assignee: ATEBA Automatisieren-Technik Bauen für Gewerbe und Industrie GmbH, Konigstein, Fed. Rep. of Germany

[21] Appl. No.: 803,790

[22] Filed: Dec. 6, 1991

Related U.S. Application Data

[63] Continuation of Ser. No. 461,427, Jan. 5, 1990, abandoned which is a continuation of PCT/EP88/00608 filed Jul. 7, 1988 abandoned.

[30] Foreign Application Priority Data

Jul. 9, 1987 [DE] Fed. Rep. of Germany ..... 87109924

[51] Int. Cl.$^5$ ............................................. B65G 67/60
[52] U.S. Cl. .................... 414/140.8; 198/594; 198/812; 414/141.7
[58] Field of Search ............... 198/594, 812; 414/140.8, 141.3, 141.7

[56] References Cited

U.S. PATENT DOCUMENTS

| 1,525,950 | 2/1925 | Prescott. | |
|---|---|---|---|
| 4,676,364 | 6/1987 | Ammeraal | 414/140.8 X |
| 4,681,523 | 7/1987 | Thelen | 198/594 X |
| 4,878,796 | 11/1989 | Ammeraal | 414/140.8 X |

FOREIGN PATENT DOCUMENTS

| 1274505 | 8/1968 | Fed. Rep. of Germany. | |
|---|---|---|---|
| 1290875 | 3/1969 | Fed. Rep. of Germany. | |
| 8702398 | 5/1989 | Netherlands | 414/140.8 |

Primary Examiner—Michael S. Huppert
Assistant Examiner—Janice Krizek
Attorney, Agent, or Firm—Anderson Kill Olick & Oshinsky

[57] ABSTRACT

The ship loading and unloading installation consists of a quayside gantry (20) with a vertically slewable jib (30) which is formed by a supporting arm (130) with a supporting frame (40) and a horizontally displaceable supporting frame (50) guided within the same which, at its free end carries a vertical conveyer (60) that can be made to travel in its height with a pallet conveying device constructed as a lifting platform (162), which interacts with a supplying or delivering path (70) for goods to be conveyed arranged in the jib (30), which comprises a conveying path (170) arranged within the supporting frame (50), a conveying path (270) arranged within the supporting frame (40) and a conveying path (370) arranged between these two conveying paths (170,270), which can be made to travel out from the interspace formed between the two conveying belts (170,270) through the supporting frame (50) being displaced out from the supporting frame (40), so that loaded pallets are transported on a conveying path with continuous points of transition.

19 Claims, 5 Drawing Sheets

DEVICE FOR LOADING AND UNLOADING UNITARY CARGO ONTO AND FROM SHIPS

This is a continuation application of Ser. No. 07/461,427, filed Jan. 5, 1990, now abandoned which is a continuation application of International application No. PCT/EP88/00608, filed Jul. 7, 1988, now abandoned.

BACKGROUND OF THE INVENTION

The present invention relates to an installation for loading and unloading, especially of ships with package cargo goods, more particularly of loaded pallets, consisting of a gantry with a vertically slewable jib provided with a supply path and a discharge path for goods to be conveyed which, at its free end, carries a vertical conveyer which interacts with the supply and discharge path for goods to be conveyed and which, at its lower end, carries a receiving and delivering device for goods to be conveyed.

From the DE-A-1 290 875, there is known an installation for the loading and unloading, especially of ships, with package cargo goods or bulk material, consisting of a gantry and a vertically slewable jib provided with a conveyer which, at its free end, carries a vertical supporting rig with a spiral conveyer member constructed as an endless conveyer belt driven across guide rollers, the upper free end of which is arranged within the delivery area of the delivery side of the conveyer supported in the slewable jib, feed belts being fitted in front of it on the bridge platform, wherein, above the spiral conveyer supported within the supporting structure, a second spiral conveyer is disposed in a supporting frame run inside the supporting structure and rotatable around its longitudinal axis, which, on its outer wall, is provided with screw thread-shaped profilings which engage with mating profiles constructed on the inner wall of the supporting structure which, as well as the profilings of the pitch of the spirals of the conveyers are configured accordingly, of which the upper conveyer is provided with a transfer roller mounted in front of its upper deflection drum, said transfer roller being rotatingly driven in the conveying direction and supported within the supporting frame of the conveyer.

In addition, from the DE-A-26 22 399, there is known a vertical conveyer for the loading and unloading, especially of ships with package cargo goods, with a vertical conveyer path which, at the ground end, is connected with a stationary supply and discharge belt for goods to be conveyed and which is arranged within a supporting frame which, with its upper extremity, is supported on a stationary supporting structure and which, within this structure, is rotatable around a vertical axis and is provided with a revolving table for transferring the goods to be conveyed from the vertical conveyer path onto the supply path or vice versa, the revolving table being provided with a central opening for the vertical conveyer path to pass through as well as with a stripper, wherein, in the supporting frame above the revolving table, within the delivery or supply area of the vertical conveyer path, a belt conveyer is disposed which, at its extremity facing away from the vertical conveyer path, is provided with a plate-shaped stripper that is pivotable around a vertical axle center and which, on both sides of its extremity facing away from the vertical conveyer path, is provided with transfer paths extending toward the revolving table, and in which, within the area of the stationary supply or delivery belt for goods to be conveyed, a further stripper can be pivoted around a vertical axle center above the revolving table.

Both known ship loading and unloading installations have in common a travelling gantry with a horizontal bridge platform and a jib which can be raised and lowered on one side that is hingedly connected to the gantry and which, at its free end, carries a vertical conveyer, the overall arrangement being such that the vertical conveyer assumes a vertical position in every slewing position of the jib. This vertical conveyer interacts with a supply and discharge belt for goods to be conveyed that is arranged on the vertically displaceable jib so that goods arriving on the supply or discharge conveyer belt are delivered to the vertical conveyer or are delivered from the vertical conveyer to the supply or discharge conveyer belt when goods are unloaded. The supply and discharge conveyer belt disposed within the jib and interacting with the vertical conveyer extends in this case across the entire length of the jib. On the gantry side, further conveyer belts are assigned to the supply or discharge belt for supplying or delivering goods. If, over and above that, the jib with the goods supply or discharge conveyer belt is constructed longitudinally displaceable on the gantry of the loading and unloading installation, then a further conveyer belt is arranged for bridging the gap between the supply or discharge conveyer belt and the supply conveyer belt assigned to the latter, which further conveyer belt is, however, not arranged lying in the conveyance plane of the supply or discharge conveyer belt or of the supply belt assigned to the same, but opposite the plane of the supply or discharge conveyer belt and its supply belt in a plane located at a lower level, in which then, in the rotation area of the supply and discharge conveyer belt assigned to the same which faces this conveyer belt, transfer rollers are provided so as to enable the goods being conveyed to overcome the differences in height produced by the staggered arrangement of the conveyer belts. However, such loading and unloading installations are suitable exclusively for the conveyance of sacks and package cargo goods, but not for loaded pallets since, in order to avoid a displacement of the pallet load, loaded pallets can always be conveyed only in a horizontal or in a vertical plane.

SUMMARY OF THE INVENTION

The present invention solves the technical problem of providing an installation for loading and unloading ships with loaded pallets, with the aid of which a conveyance of loaded pallets in the inwardly and outwardly displaceable jib of the installation in a conveying plane with continuous transition points in every outward displacement position of the jib with a simultaneous adaptation of the conveyance plane to the length of the displacement path given in each case by the inward and outward displacement of the displaceable section of the jib is ensured without the pallet load being displaced during the conveyance of the loaded pallets.

With an installation constructed in such a way the loading and unloading of ships with loaded pallets is possible. The loaded pallets are removed from or supplied to the ship's hold by means of the vertical conveyer which is provided with the lifting platform and lowered vertically into the cargo hold, and delivered by the vertical conveyer to the supply or discharge conveyer belt of the jib or are received by the same, all depending on whether a loading or unloading operation is involved. At the same time, after the loaded pallets have been taken over by the supply or discharge conveyer belt, the pallets are supplied on an even conveyance path to a further vertical, conveyer provided on the quayside, in which, during the conveying operation, the loaded pallets, prior to their being transferred onto the vertical conveyer disposed on the quayside, are in no way moved out of the conveyance path lying in one plane, said path being made up of three conveyer belts, of which one conveyer belt participates in the outward and inward displacement motions of the supporting frame on the side where the ship is located, while the second conveyer belt is stationarily mounted in the supporting frame disposed on the supporting arm of the jib. The interspace to the conveyer belt on the stationary supporting frame created by the inward or outward displacement of the displaceable supporting frame is bridged by the third conveyer belt which is displaceable between the two conveyer belts and which has dimensions that correspond at least to the dimensions of a pallet, it is possible, however, for the conveyer belt to have a length and/or width which corresponds to the multiple of the base area of a pallet so that the loading or unloading capacity of the installation can be increased when, for instance, two combined pallets are supplied to the displaceable conveyer belt or when all the conveyer belts have a width which allows the simultaneous supply of e.g. two loaded pallets standing side by side. The speed at which the displaceable conveyer belt is made to travel between the two conveyer belts of the inwardly and outwardly displaceable supporting frame and of the stationary supporting frame, depends in each case on the distance of the inwardly and outwardly displaceable conveyer belt to the stationary supporting frame, this distance being in each case determined by the length of displacement of the inwardly and outwardly displaceable supporting frame from the stationary supporting frame on the jib. The inwardly and outwardly displaceable supporting frame with its conveyer belt can be made to travel that far into the stationary supporting frame that the displaceable conveyer belt is arranged without any gap between the inwardly and outwardly displaceable conveyer belt and the stationary conveyer belt, so that then all the conveyer belts have the same rotational speeds, it being also possible for the rotational speeds to be relatively high, but they should only be so high that, due to the centrifugal forces developing on account of the forward movement of the loaded pallets, no getting out of place of the pallet load occurs. If the inwardly and outwardly displaceable supporting frame with its conveyer belt is travelled out of the stationary supporting frame, then the speed of travel of the displaceable conveyer belt is geared to the length of the interspace between the two conveyer belts so that high operating speeds can be attained also in this fashion.

The important advantage of this loading and unloading installation consists in that it is possible to convey not only pallets loaded with package cargo goods, but equally successfully also pallets loaded with stacked sacks, without it being possible for displacements of pallet loads to take place, since, for the loading and unloading of the loaded pallets only vertical and horizontal movements of travel are executed, all transition points between the various conveyer belts in the jib of the installation being constructed in a continuous manner.

Advantageous developments of the invention are characterized in the subclaims.

BRIEF DESCRIPTION OF THE DRAWINGS

In the following the subject matter of the invention is explained with the aid of the drawings.

DETAILED DESCRIPTION OF THE PREFERRED EMBODIMENT

Figure 1:
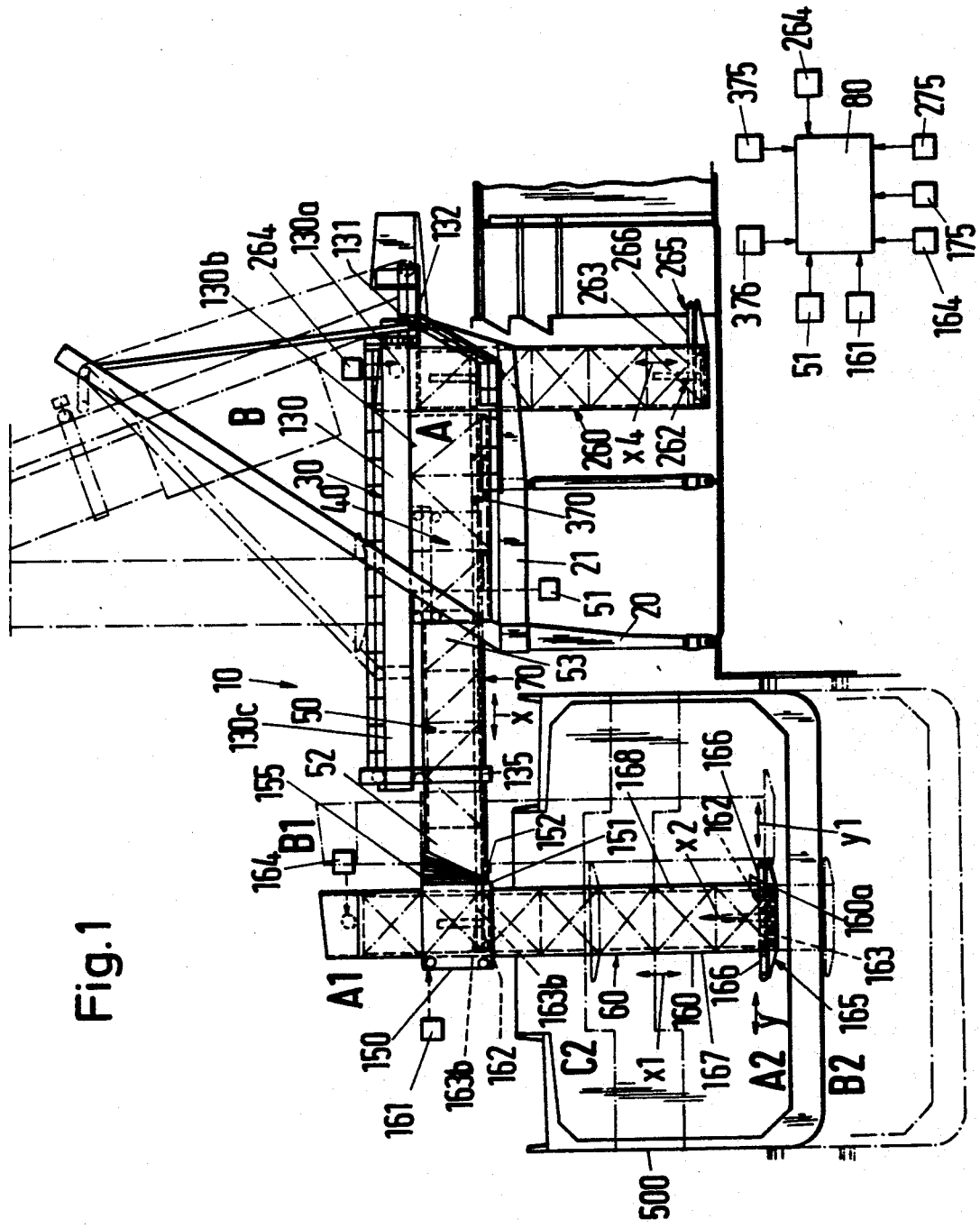
FIG. 1 shows, in a side elevation, a ship loading and unloading installation with a vertical conveyer and a supply and discharge conveyer belt in the jib of the installation.

The ship loading and unloading installation 10 depicted in FIG. 1 consists of a travelling gantry 20 with a horizontal bridge platform 21 which carries a unilaterally raisable and lowerable jib 30 comprising a supporting arm 130 which, at its extremity 130a within the rearward area of the gantry 20 is hingedly connected to the latter or to the bridge platform 21 at 131 and, with the aid of a drive means not shown in the drawing, is vertically pivotable around a horizontal swivel axis 132. On the underside 130b of the supporting arm 130, a preferably box-shaped supporting frame 40 is disposed which is rigidly connected to the supporting arm 130. This supporting frame 40 preferably has a length which, in comparison with the length of the supporting arm 130, is dimensioned to be shorter. In addition, the supporting frame 40 is, within the rearward area of the supporting arm 130, i.e. adjacent to the hinging point 131 of the supporting arm 130, arranged on the gantry 20 or on the bridge platform 21. This supporting frame 40 consists of a frame structure which may also be provided on all sides with a lateral covering for protecting the goods to be conveyed against humidity, rain, etc.

This supporting frame 40 arranged on the supporting arm 130 serves to accommodate, mount and guide a further, preferably box-shaped, supporting frame 50 which can be made to travel in the direction of the arrow X from the supporting frame 40, or which can be made to travel into the supporting frame 40. For this purpose, the supporting frame 40 is provided with guide rails not shown in the drawing or differently constructed guide means, while the supporting frame 50 is provided with appropriate structural elements which render a displacement of the supporting frame 50 on the guide rails of the supporting frame 40 possible. This supporting frame, too, is provided with a lateral covering for protecting the goods to be conveyed against humidity, rain, etc. The displacement of the supporting frame 50 is effected with the aid of a preferably electromotively constructed drive means indicated at 51 which, however, can be constructed differently, just like all the further drive means still used in the overall installation 10. In order to ensure a secure guidance of the inwardly and outwardly displaceable supporting frame 50, the jib 130, on its front extremity 130c, is provided with a downwardly directed guide means mounting support 135 which may e.g. be constructed in the form of a V-shaped stirrup and which grips around the outer circumference of the supporting frame 50 and which is provided with guide elements as, for instance, guide rollers or the like, so that an effortless displacement of the supporting frame 50 in the direction of the arrow X is possible.

In the embodiment depicted in FIG. 1, the supporting frame 50 carries, on its free front end 52, a load plate 150 which is hingedly connected at 151 on the underside of the supporting frame 50 and which is pivotable around a horizontal swivel axis 152. This load plate 150 serves to accommodate a vertical conveyer 60 which will be dealt with in detail later.

Since the jib 30 of the ship loading and unloading installation 10 consists of the supporting arm 130, the supporting frame 40 rigidly connected to the latter and of the inwardly and outwardly displaceable supporting frame 50, the supporting arm 130 and the two supporting frames 40, 50 participate in every vertical displaceability of the jib 130 or of the supporting arm 130, as is shown in FIG. 1 by the positions A and B. In order to make sure that the vertical conveyer 60 which is articulatedly connected on the free front end 52 of the supporting frame 50, assumes a vertical position in every slewing position of the jib 30, the vertical conveyer 60 is articulatedly connected to the supporting frame 50 which, in the embodiment shown in FIG. 1, is effected by means of the load plate 150 which is hingedly connected at 151 to the supporting frame 50. The transition area between the load plate 150 and the supporting frame 50 is closed by means of a bellows 155 as a protection against humidity, rain, etc.; this bellows 155 adapts itself to all angular positions of the vertical conveyer 60 relative to the jib 30. The load plate 150 accommodating the vertical conveyer 60 is, just like the supporting frames 40, 50, provided with a protective lateral covering. The overall arrangement is made in this connection in such a way that the vertical conveyer 60 assumes a vertical position with every slewing position of the jib 30, which is achieved e.g. with the aid of parallel guide means not shown in the drawing or by means of hydraulic or pneumatic or otherwise operated actuator cylinders. However, there also exists the possibility of providing the swivel axis 152 with a drive means so that, by the pivoting of the swivel axis 152, the pivoting of the load plate 150 is controlled so that the vertical conveyer 60 assumes a vertical position in every slewing position of the jib 30, in this case the load plate 150 is then connected with the swivel axis 152 in such a way that when the swivel axis 152 is rotated around its longitudinal axis, the load plate 150 is also pivoted along with the latter; but there also exists the possibility of employing differently constructed drive means. The raising and the lowering of the jib 30 is effected by means of a cable tackle or the like.

Figure 2:
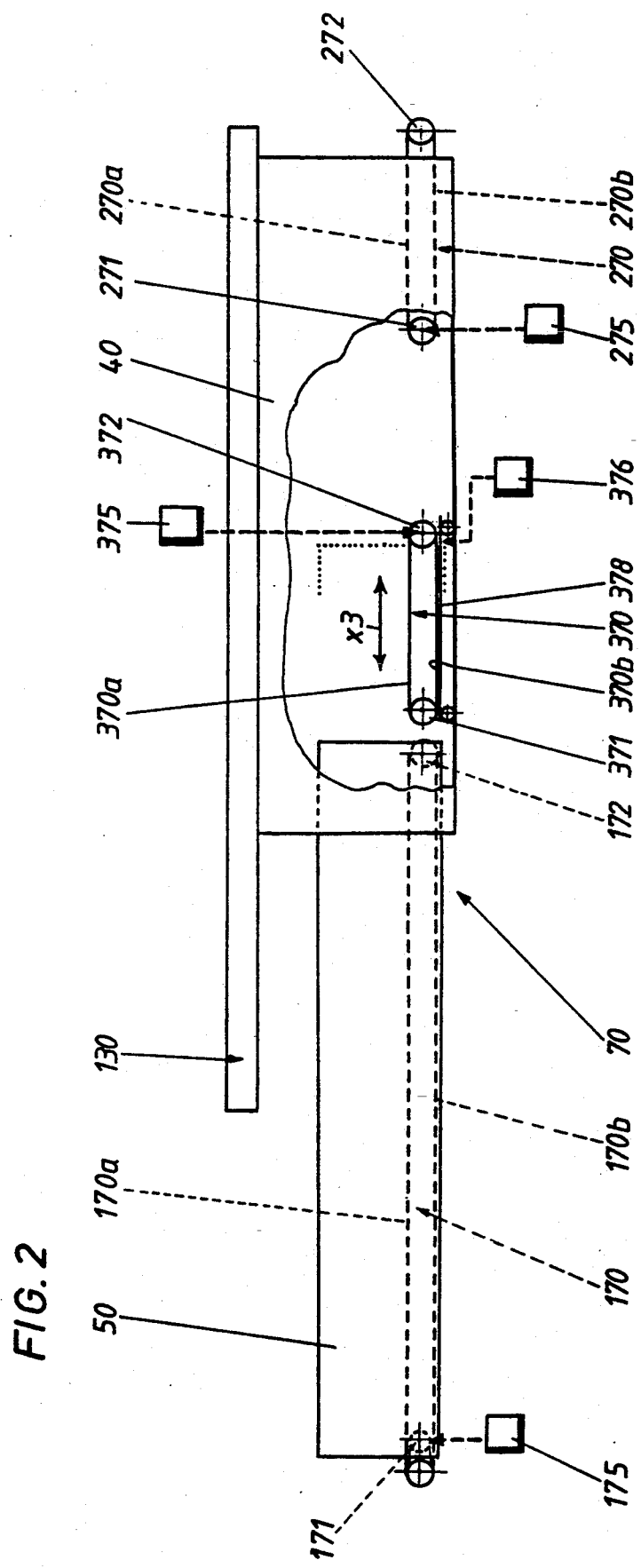
FIG. 2 shows a partial section of the ship loading and unloading installation with the supply and discharge conveyer belt consisting of three conveyer belts.

In the inner spaces of the supporting frame 40 and the supporting frame 50, a conveyer supply or delivery belt 70 is disposed, which will be dealt with in detail later (FIG. 2).

In the embodiment shown in FIG. 1 of the ship loading and unloading installation 10, the vertical conveyer 60 consists of a frame-like carrying framework 160 made up of e.g. two longitudinal members which complement one another so as to form a square or rectangular sectional area and which are interconnected by means of cross struttings. In FIG. 1, of the four longitudinal members only the two longitudinal members 167, 168 are shown in such a way as to be discernible. This carrying framework 160, too, may be provided with a lateral cover for the protection of the goods to be conveyed. This carrying framework 160 is retained and guided within the load plate 150 in such a way that the carrying framework 160 is vertically displaceable in the direction of the arrow X1, so as to make it possible for the carrying framework to be made to travel into the cargo hold of a ship indicated by 500. The total length of the carrying framework 160 is dimensioned approximately in such a way that, in the lowered state, the end located close to the ground or on the ground 160a of the carrying framework 160 comes to rest above the loading surface of the ship's bottom. Due to this vertical displaceability of the carrying framework 160, an adaptation to the respective cargo holds of a ship and to the draft of the same is possible.

The vertical displacement of the carrying framework 160 is effected with the aid of a drive means indicated at 161 in FIG. 1 which, by preference, is electromotively driven, it being also possible, however, for differently constructed drive means to be employed. This drive means 161 consists preferably of an electric driving motor and appropriately constructed tackle lines, by means of which the displacement motions of the carrying framework 160 are effected and controlled in the direction of the arrow X1. In this case the drive means 161 is preferably integrated into the load plate 150. Thus the possibility exists of providing the four longitudinal members 167, 168 making up the carrying framework 160 on the outside with rack-shaped members into which the drive pinons provided on load plate 150 engage, which are driven by the drive means 161. It is possible, though, for differently constructed drive means to be employed here.

The carrying framework 160 accommodates within its inner space a lifting platform 162 with a conveying platform. This lifting platform 162 is displaceable with the aid of a drive means indicated at 164 in the direction of arrow X2 within the inner space of the carrying framework 160, this drive means 164 consists of a driving motor and a tackle line driven by means of this driving motor. The conveying platform 163 of the lifting platform 162 is formed by at least one rotatingly drivable conveyer belt, it being possible, however, as shown in FIG. 1, for the conveying platform 163 to be also made up by two conveyer belts 163a, 163b. Each of these conveyer belts consists of a belt guided and driven by deflection rollers. The direction of rotation of these conveyer belts 163a, 163b is changeable, that is to say, in adaptation to whether a loading or an unloading operation is being carried out. In lieu of a conveyer belt or instead of two conveyer belts 163a, 163b, the conveying platform may also be constituted of rotatingly drivable conveying rollers.

At its end 160a near or on the ground, the carrying framework 160 carries a receiving or delivering device 165 for goods to be conveyed as shown in FIG. 1 which is constructed in a manner known per se and which consists of one or several conveyer belts, or of roller conveyers with driven rollers, it being possible for this receiving or delivering device 165 for goods to be conveyed to be constructed in such a fashion that, on both sides of the carrying framework 160, one conveying path 166 each is constructed, by means of which the loaded pallets can then be passed over onto the lifting platform 162 lowered to the level of the conveying path 166. Since the two conveying paths 166 for the lateral supply of the loaded pallets consist of rotatingly driven belts and because the conveying platform 163 likewise consists of rotatingly driven belts, a continuous passage of the loaded pallets from one of the conveying paths 166 onto the other conveying path 166 or onto the conveying platform 163 of the lifting platform 162 is ensured. The delivery or the discharge of loaded pallets onto the conveying paths or from the conveying paths 166 is indicated in FIG. 1 by the arrows Y and Y1, respectively.

The supply or delivery belt 70 for goods to be conveyed consists, as depicted in FIGS. 1 and 2, of three conveying paths 170, 270, 370 which, in the embodiment shown in FIG. 1, are constructed as conveyer belts, it being also possible, though, for differently constructed conveying and handling means to be employed for the pallet loads. The conveyer belt 170 is arranged within the inner space of the inwardly and outwardly displaceable supporting frame 50 and consequently participates in the inward and outward travel movements of the supporting frame 50. This conveyor belt 170 consists of an endless belt guided across deflection rollers, one of the two deflection rollers 171, 172 being driven. An appropriate drive means is indicated at 175.

The upper running belt portion of the conveyer belt 170 is indicated at 170a and the lower running belt portion at 170b. This conveyor belt 170 has a length which corresponds approximately to the length of the supporting frame 50, so that, when the supporting frame 50 is displaced with a section into the stationary supporting frame 40, the conveyor belt 170 then also comes to be located with the correspondingly identically dimensioned section in the supporting frame 40. The conveyor belt 170 terminates at the free front end 52 of the supporting frame 50 in such a way that, when the lifting platform 162 is displaced into the level of the conveyor belt 170, the conveying platform 163 of the lifting platform 162 comes to be located within the area of the upper running belt portion 170a of the conveyer belt 170, so that a continuous passage between the conveying platform 163 of the lifting platform 162 and the conveyer belt 170 is ensured.

The conveyer belt 270 is arranged within the stationary supporting frame 40, this conveyer belt 270 has a length which is less than the length of the supporting frame 40, i.e. the length of the conveyer belt 270 is, in comparison with the length of the supporting frame 40, dimensioned so as to be shorter by that area which is determined by the section of the supporting frame 50 when the same is displaced into the supporting frame 40. The rearward end 53 of the inwardly and outwardly displaceable supporting frame 50 thus terminates while forming an interspace in front of the stationary conveyer belt 270 in the stationary supporting frame 40 which is secured to the supporting arm 130. The conveyer belt 370 is arranged in this interspace between the conveyer belt 170 and the conveyer belt 270. This conveyer belt 370 is provided with dimensions which make it possible for a single loaded pallet to be accommodated, i.e. the length of this conveyer belt 370 corresponds approximately to the length or the width of a pallet. If the supporting frame 50 is inserted into the supporting frame 40 up to its stop, then the conveyer belt 370 is linked directly onto the end of the conveyer belt 170, onto which, in turn, the conveyer belt 270 is linked, so that a continuous conveying path located in one plane for the goods to be conveyed is obtained. If, on the other hand, the supporting frame 50 is made to travel out of the supporting frame 40, then an interspace is created between the two conveyer belts 170, 270 which is greater than the length of the conveyer belt 370. In order to ensure a continuous conveyance of the goods across this interspace, the conveyer belt 370 is displaceable between the two conveyer belts 170, 270 in the direction of the arrow X3. The conveyer belt 370 itself consists of an endless belt run across deflection rollers 371, 372, one of the two deflection rollers being driven. An appropriately constructed drive means is indicated at 375. The upper running belt portion is identified by 370a and the lower running belt portion of the conveyer belt 370 is identified by 370b. This conveyer belt 370 is disposed on a slide 378 which is displaceable on guide rails not shown in the drawing in the direction of the arrow X3. For this displaceability, a drive means 376 is provided which is reversible, so that the slide 378 with its conveyer belt 370 can be displaced both in the one direction as well as in the other direction.

The conveyer belt 270 which is arranged within the interior of the stationary supporting frame 40, likewise consists of an endless belt conducted across deflection rollers 271, 272, one of the two deflection rollers being driven. An appropriate drive means is identified by 275.

The upper running belt portion of the conveyer belt 270 is indicated at 270a and its lower running belt portion at 270b.

Within the area on or near the ground and within the area of its end facing the conveyer belt 370, the supporting frame 50 is constructed open in order to ensure an inward travel of the conveyer belt 370 up to the area of the conveyer belt 170. The overall arrangement of the conveyer belts 170, 270, 370 is such that their upper running belt portions 170a, 270a, 370a are located in one plane and continuous passages are provided. The inward and outward displacement of the supporting frame 50 is indicated in FIG. 1 by the positions A1 and B1. The vertical displaceability of the vertical conveyer 60 is indicated by the positions A2, B2 and C2.

The drive means 164, 175, 275, 375, 376 for the lifting platform 162, for the conveyer belt 170 that is inwardly and outwardly displaceable together with the carrying framework 160, for the conveyer belt 270 in the stationary supporting frame 40 and for the displaceable conveyer belt 370, are constructed in a control system 80 in such a way that, when an article to be conveyed has reached the end of the conveyer belt 170 which faces away from the vertical conveyer 60, the displaceable conveyer belt 370 has been displaced into the takingover position adjacent conveyer belt 170. When putting the conveyer belts into operation, the goods to be conveyed are transferred from the conveyer belt 170 onto the conveyer belt 370 onto the conveyer belt 270. If the displaceable conveyer belt 370 is arranged between the two conveyer belts 170, 270, then a direct transfer of the goods to be conveyed from the conveyer belt 170 onto the conveyer belt 370 and from the latter onto the conveyer belt 270 is effected. If, on the other hand, the supporting frame 50 with its conveyer belt 170 has been made to travel out from the supporting frame 40, then the conveyer belt 370, subsequent to having taken over an article to be conveyed from the conveyer belt 170, is made to travel up into the receiving area of the conveyer belt 270; the article to be conveyed is then delivered from the conveyer belt 370 onto the conveyer belt 270, during the displacement of the conveyer belt 370, the rotation of the belt is discontinued since, during the displacement, a conveying of the goods to be conveyed on the conveyer belt 370 itself must not take place. Only once the conveyer belt 370 has been moved up to the conveyer belt 170 or up to the conveyer belt 270, the belt of conveying system 370 is set into rotation so that a taking over of goods to be conveyed from the conveyer belt 170 onto the conveyer belt 370, or a delivery of goods from the conveyer belt 370 onto the conveyer belt 270 can take place, the direction of rotation of the conveyer belts 170, 270, 370 depends in each case on whether a ship is to be loaded or unloaded.

The rotational speeds of all three conveyer belts 170, 270, 370 may be identical, while the speed of displacement or speed of travel of the conveyer belt 370 depends in each case on the length of the distance to be covered, that is to say, on the length of the interspace between the conveyer belt 170 and the conveyer belt 270. If this distance between the conveyer belt 170 and the conveyer belt 270 is negligible, then no high speed is required for the displacement of the conveyer belt 370; if, on the other hand, the distance between the conveyer belt 170 and the conveyer belt 270 is substantial, in that case it is advantageous if the conveyer belt 370 is displaced with increased speed in order to achieve a high unloading or loading performance, however, the speed of travel of the conveyer belt 370 will in this connection have to be calculated in such a way that a displacement of the pallet load on the pallet is avoided. The rotational speeds and the speed of travel of the conveyer belt 370 are controlled by means of the control system 80 and the drive means of the conveyer belts 170, 270, 370, that is, in each case as a function of the travel path to be covered of the displaceable conveyer belt 370 and the travel movements of the lifting platform 162, so that a continuous conveying from the receiving or delivering device 165 for goods to be conveyed via the lifting platform 162 of the vertical conveyer 60 and via the receiving or delivering belt 70 for goods to be conveyed to the delivering or receiving station, which is located on the quayside, is effected.

As shown in FIG. 1, a vertical supporting frame 260 is disposed at the rearward end 130a of the jib 130, which may be constructed in conformity with the carrying framework 160. In this supporting frame 260, a lifting platform 262 with a conveying platform 263 is arranged. The vertical displacement of the lifting platform 262 in the direction of the arrow X4 is effected with the aid of a drive means indicated at 264 which is likewise connected with the control system 80. At its ground end, the supporting frame 260 carries a receiving or delivering device for goods 265 to be conveyed which is constructed in conformity with the receiving or delivering device 165. The travelling movements of the lifting platform 262 in the supporting frame 260 are synchronized with the motion sequence of the lifting platform 162 and the conveyer belts 170, 270, 370 so that, goods delivered via the receiving and delivering device 265, are conveyed by means of the lifting platform 260 into the area of the conveyer belt 270. From the conveyer belt 270, the goods to be conveyed are then delivered onto the conveyer belt 370 which has been moved up to conveyer belt 270 for the transfer of the goods. After that the conveyer belt 370 travels until it abuts against the conveyer belt 170, from which the goods to be conveyed are taken over and conveyed to the lifting platform 162 of the vertical conveyer 60. The lifting platform 162 accepts the goods from the conveyer belt 170, whereupon the lifting platform 162 travels down to the receiving or delivering device 165 and the goods are then delivered from the latter into the cargo hold of a ship 500. The loading of a ship is possible in this fashion within the shortest unit of time. The unloading of a ship is effected in the same way, but the directions of rotation of the conveyer belts and the travelling movement of the conveyer belt 370 are reversed.

The vertical conveyer 60 used in the ship loading and unloading installation 10 may also be constructed differently. The use of a lifting platform 162 is particularly advantageous when loaded pallets or larger package cargo articles are to be conveyed. Different package cargo goods, such as sacks, can also be conveyed by means of a spiral conveyer or a clamp-type belt conveyer to the supply and discharge conveyer belt 70 on the jib 30.

However, there also exists the possibility of controlling the speed of travel of the conveyer belt 370 based on the respective depth of travel of the supporting frame 50 into the supporting frame 40. The farther the supporting frame 50 travels into the supporting frame 40, the lower the speed of travel of the conveyer belt 370 will be, while the speed of travel increases when the interspaces between the two conveyer belts 170, 270 become larger.

Figure 4:
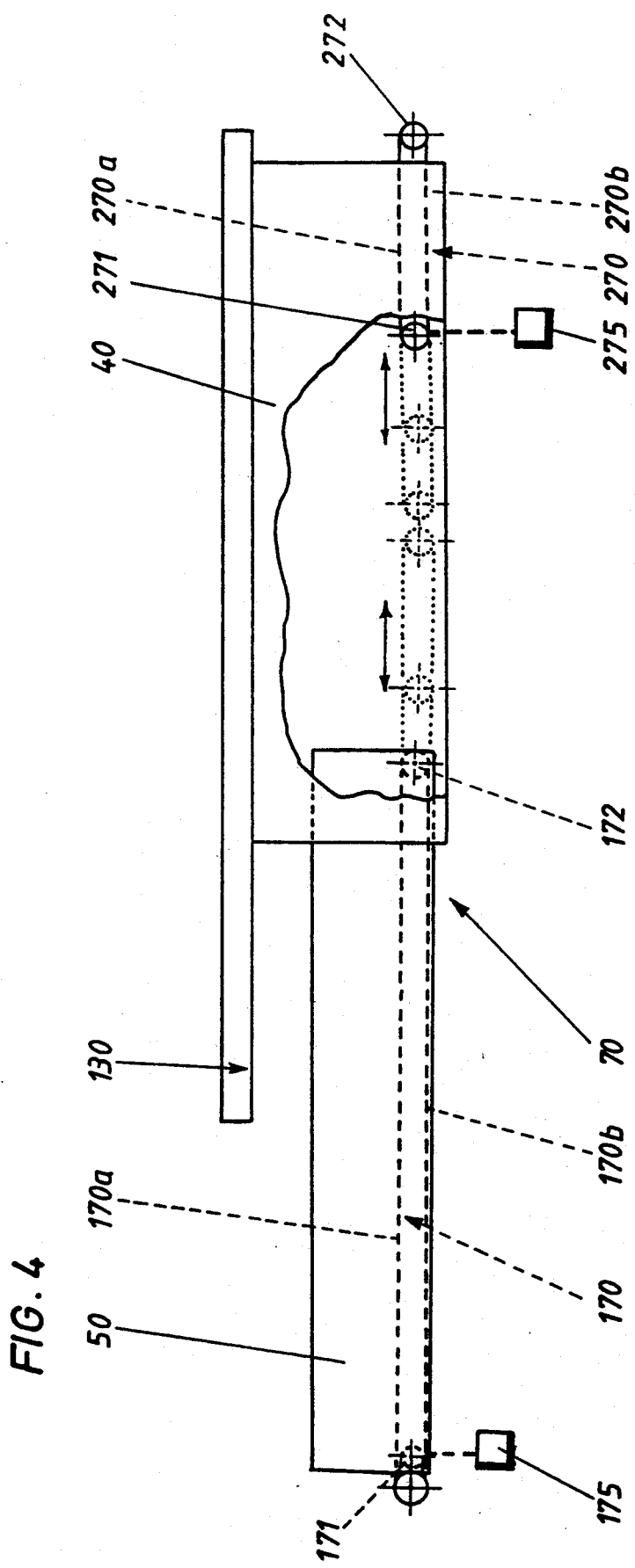
FIG. 4 shows, in an enlarged side elevation, the two telescopically constructed conveying paths.

In the embodiment shown in FIGS. 1 and 2, for bridging the gap between the two conveyor belts 170, 270, a further conveyer belt 370 is disposed which is displaceable between the two conveyer belts 170, 270 as a function of the, in each case, obtained gap between these two conveyer belts 170, 270. According to a further embodiment per FIG. 4, this gap can also be bridged without a displaceable converter belt 370, in that the two ends of the two conveyer belts 170, 270 facing one another are constructed telescopably so the the two conveyer belts 170, 270 are variable as to their lengths. This is achieved e.g. in that each conveying path 170, 270 consists of two conveyer belts, chains, etc., arranged spaced away from one another and rotatably driven, in which case then between the two conveyer belts in a supporting frame, a further conveyer belt or two conveyer belts arranged side by side is or are disposed. This supporting frame is then horizontally displaceable in the inward or outward direction so that every length of the interspace between the two conveyer belts 170, 270 can be bridged. There also exists the possibility of constructing only one of the conveyer belts 170 or 270 telescopably.

Figure 3:
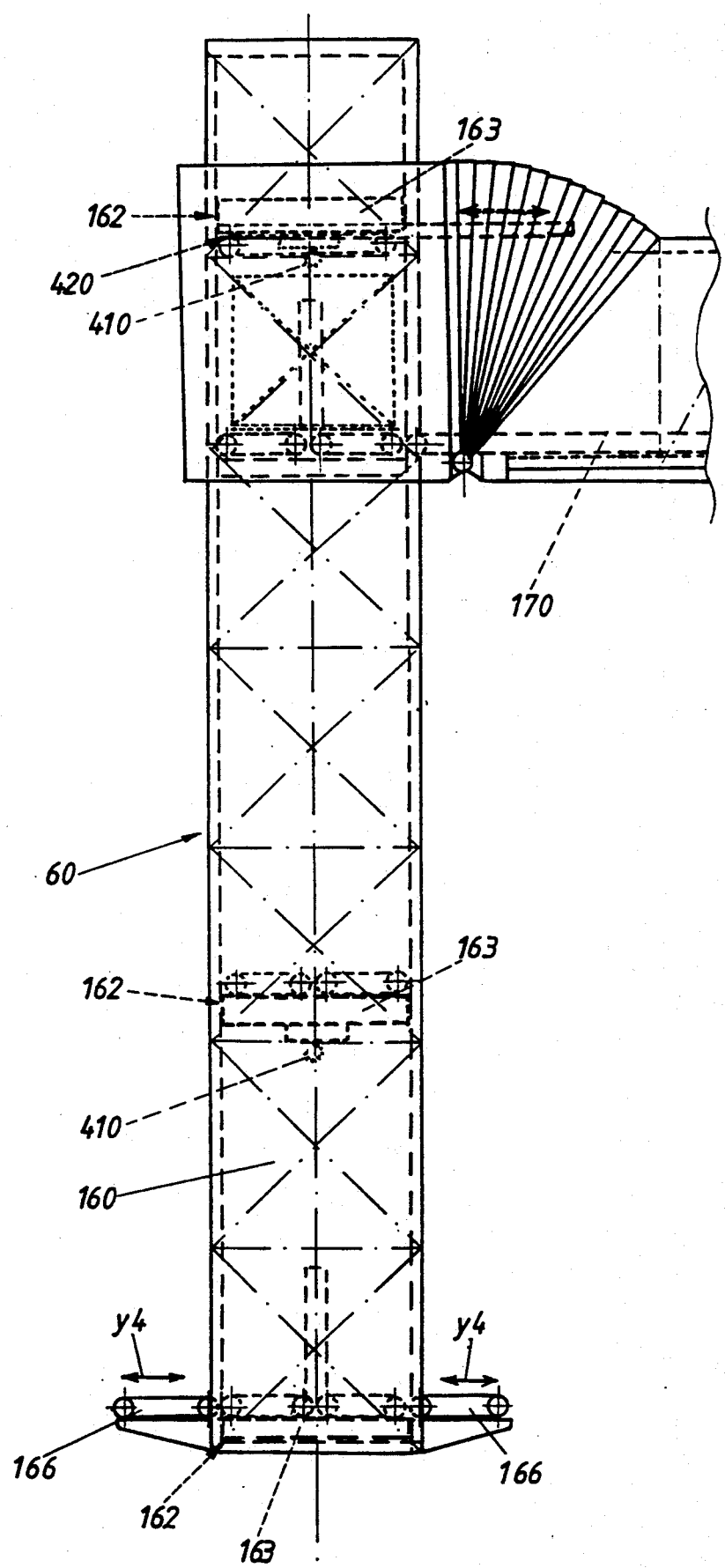
FIG. 3 shows, in an enlarged side elevation, the vertical conveyer with the ground receiving or delivering device for goods to be conveyed.

The last pallet load is, since a loading by means of the vertical conveyer or a fork-lift truck is no longer possible, placed in the loaded cargo hold of a ship by means of slings, the slings remaining in this case on the pallet load so that it will be possible to remove the same for the unloading from the hold, it will then be possible to insert the vertical conveyer into the free space thus provided. For attaching the slings, the conveying platform 163 of the lifting platform 162 is, on its underside, provided with a lifting means 410 on which the pallet conveying slings can be attached. This lifting means 410 may e.g. consist of a hook or cable winch with cable and hook (FIG. 3). In order to be able to deliver the pallet load raised by the lifting means and brought into the upper area of the vertical conveyer 60 by displacing the lifting platform 162 onto the conveyer belt 170, the conveying platform 163 of the lifting platform 162 is provided with a transverse conveying installation 420 which may consist of a conveying slide or the like which, by means of cantilever beams not shown in the drawing, can be made to travel laterally from the vertical conveyer 60. The pallet load is then displaced above the conveyer belt 170 and lowered upon the same (FIG. 3). When not in use, the cantilever beam can be displaced underneath or into the conveying platform.

The receiving or delivering device 165 for goods to be conveyed arranged at the ground end 160a of the carrying framework 160 consists of a laterally projecting conveying path 166 or of two horizontal conveying paths 166 arranged on both sides of the carrying framework 160, which are rigidly connected to the carrying framework 160 or are horizontally displaceable in the outward and inward sense in the direction of the arrows Y4. In the inwardly displaced state, the two conveying paths 166 are located in the carrying framework 160 and then occupy a space that corresponds to the area of the conveying platform 163 of the lifting platform 162 (FIG. 3). This inward and outward travel of the conveying paths offers the advantage that, when the conveying paths 166 are displaced into the carrying framework 160, the vertical conveyer 60 then has the smallest sectional area dimensions, thus dimensions which approximately correspond to those of a pallet surface so that the vertical conveyer can also be displaced inwardly into the free space of several pallet loads arranged side by side which is created by the removal of a pallet load from the entire pallet load cargo.

Figure 5:
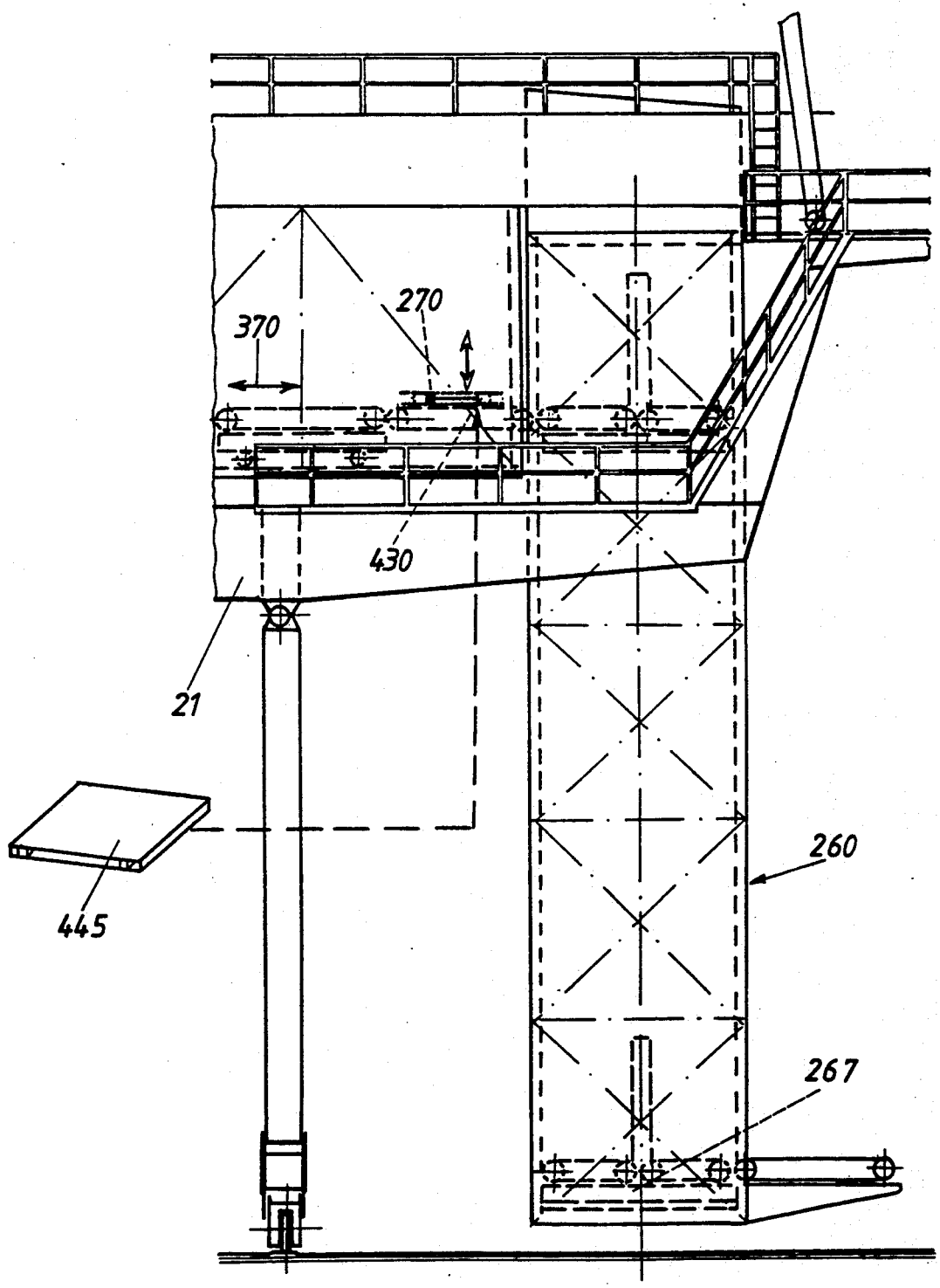
FIG. 5 shows, in an enlarged side elevation, the pallet lifting device arranged within the area of the rearward conveying path.

Within the area of the conveyer path 270, a pallet lifting means 430 is arranged, with the aid of which it is possible to both raise and lower the pallets arriving on this conveying path 270 loaded with goods to be conveyed. This lifting serves to provide an interspace above the conveyer path 270 so that terminal pallets can be inserted into this interspace in order to make it possible for pallets to be deposited on these terminal pallets 445. Since pallets have different configurations and may also be damaged so that no perfect pallet base is obtained, so-called terminal pallets are used which are plate-shaped in construction, have a low height and are, moreover, constructed in such a way that they can be seized, raised or lowered by the fork of a fork-lift truck. Pallets with loads that are deposited on such terminal pallets can be perfectly stacked and assembled to form stacks even when the pallets upon which the loads are disposed are damaged. This pallet lifting means 430 consists e.g. of the fork which is displaceable underneath the loaded pallet arriving on the conveyer path and which corresponds to that of a fork-lift truck and of a hydraulic lifting device, it being possible, however, for differently constructed lifting means to find application. Preferably, the lifting device 430 is disposed at the end of the conveying path 270, thus at the end facing the supporting frame 260 with the lifting platform 262. The removal of the terminal pallets is carried out from a magazine or supply shaft not shown in the drawing with the aid of an individual selection device. Following the removal of a terminal pallet, the entire stack of terminal pallets in the supply shaft is displaced upwardly. The removal of the individual terminal pallets is carried out by means of an e.g. hydraulically driven transverse slider. Terminal pallets which are not required, are again returned to the supply shaft (FIG. 5).

What is claimed is:

1. A device for loading and unloading ships carrying bulk goods, including loaded pallets, comprising:

a vertically slewable jib (30) mounted on said gantry, said jib (30) comprising a supporting arm (130) having one end (130a) secured to said gantry (20) so as to vertically pivot around a horizontal swivel axis (132);

a stationary supporting frame (40);

a horizontally displaceable and telescoping supporting frame (50) secured in said stationary supporting frame (40), said stationary supporting frame (40) being rigidly connected to an underside (130b) of said supporting arm (130) so as to be a guide path for said displaceable supporting frame (50), said displaceable supporting frame (50) having a free front end (52);

first drive means (51) for horizontally displacing said displaceable supporting frame (50) in a telescope-like manner so that said displaceable supporting frame (50) is movable into and out of said stationary supporting frame (40);

supply and discharge belt means (70) mounted on said jib (30) for conveying goods, and having a free end, said supply and discharge belt means (70) including a first conveyer belt (170) and drive means stationarily disposed in said displaceable supporting frame (50), a second conveyer belt (270) and drive means stationarily disposed in said stationary supporting frame (40), a third, horizontally displaceable conveyer belt (370) arranged between said first and second conveyer belts (170, 270) and having a length that corresponds to at least the length or width of a pallet, and third belt drive means (376) for horizontally displacing said third conveyer belt (370), said first, second and third conveyer belts (170, 270, 370) having respective upper running belt portions (170a, 270a, 370a) that are located in a single plane, said third conveyer belt (370) being displaceable between said first and second conveyer belts (170, 270) within an area defined by a respective distance of said first conveyer belt (170) from said second conveyer belt (270) in said stationary supporting frame (40), said respective distance being variable as a function of the displacement of said displaceable supporting frame (50) relative to said stationary supporting frame (40);

a vertical conveyer (60) supported on the free end of said supply and discharge belt means (70) and the free front end (52) of said displaceable supporting frame (50) so as to interact with said supply and discharge belt means (70);

a receiving and delivering device (165) for the goods, said receiving and delivering device (165) being carried by a lower end of said vertical conveyer (60), said vertical conveyer (60) including a carrying framework (160) that is vertically displaceable inside said displaceable supporting frame (50) within the free front end (52) of said displaceable supporting frame (50), said vertical conveyer (60) further including second drive means (161) for vertically displacing said carrying framework (160), a vertically displaceable lifting platform (162) having a conveying platform (63) arranged therein, and third drive means (164) for vertically displacing said lifting platform (162), said conveying platform (163) of said lifting platform (162) being movable to a position adjacent said receiving and delivering device (165) in dependence upon a conveyance range length when said carrying framework (160) is in a lowered position, said conveying platform (163) also being movable into a position adjacent said supply and discharge belt means (70); and means for controlling the third drive means (164) of said lifting platform (162), the drive means of said first conveyer belt (170), the drive means of said second conveyer belt (270), and the drive means (376) of said third conveyer belt (370), so that, for an unloading operation, when an item to be conveyed reaches the end of said first conveyer belt (170), said third conveyer belt (370) is moved into a transfer position adjacent said first conveyer belt (170) and, following transfer of the item to said third conveyer belt (370), said third conveyer belt (370) is displaced to a position adjacent said second conveyer belt (270) and, after the item is delivered onto said second conveyer belt (270), said third conveyer belt (370) is displaced again to said first conveyer belt (170), while for a loading operation, said third conveyer belt (370) is displaced oppositely to the manner in which it is displaced during the unloading operation and the rotational directions of said first, second and third conveyer belts (170, 270, 370) are reversed, the rotational speed of said first, second and third conveyer belts (170, 270, 370) and the speed of displacement of said third conveyer belt (370) being set to certain values in response to movement and speed of movements of said lifting platform (162) and distance displaced by said third conveyer belt (370).

2. A device according to claim 1, wherein the carrying framework (160) of the lifting platform (162) and the supporting frames (40, 50) of the conveyer belts (170, 270, 370) are fully covered framework structures.

3. A device according to claim 1, wherein the first conveyer belt (170) of the displaceable supporting frame (50) is movable into the travel range of the lifting platform (162).

4. A device according to claim 1, wherein the supporting frame (40) has a length which is less than the length of the supporting arm (130) and is mounted in a rearward area of the supporting arm (130), the supporting arm (130) having a front end that faces the vertical conveyer (60) and a guide mounting (135) for the displaceable supporting frame (50) supported at the front end of the supporting arm.

5. A device according to claim 1, wherein a load plate (150) is supported on the free front end of the supporting frame (50) which mounts the carrying framework (160), the carrying framework (160) being secured and guided within the load plate (150).

6. A device according to claim 5, wherein the carrying framework (150) is hingedly connected to the free front end (52) of the displaceable supporting frame (50) so as to be vertically pivotable around a horizontal axis (152).

7. A device according to claim 1, wherein the supporting arm (130) has its rearward end (130a) connected to the supporting frame (40), and wherein a vertical supporting frame (260) in which a lifting platform (262) with a conveying platform (263) is displaceably arranged is carried by the rearward end of the supporting arm (130), a receiving and delivering device (265) for goods to be conveyed being provided at a ground end of the vertical supporting frame (260).

8. A device according to claim 7, wherein the conveying platforms (163;263) of the lifting platforms (162;262) each comprise at least one conveyer belt (166;266) extending parallel to the conveyer belts (170, 270, 370).

9. A device according to claim 1, wherein the control means controls the conveyer drive means so that all the conveyer belts (170, 270, 370) have identical rotational speeds.

10. A device according to claim 1, wherein the third displaceable conveyer belt (370) has a displacement speed that is equal to the rotational speeds of the first and second conveyer belts (170, 270).

11. A device according to claim 1, wherein the third displaceable conveyer belt (370) has a displacement speed that is greater than the rotational speeds of the conveyer belts (170,270).

12. A device according to claim 1, wherein the rotation of the third displaceable conveyer belt (370) can be stopped during displacement of third the conveyer belt (370).

13. A device according to claim 1, wherein the third displaceable conveyor belt (370) has a displacement speed that is controllable as a function of distance of travel of the displaceable supporting frame (50) into the stationary supporting frame (40).

14. A device according to claim 1, wherein the conveying platform (163) of the lifting platform (162) has an underside on which a lifting device (410) is provided for attachment of pallet handling slings.

15. A device according to claim 14, wherein the conveying platform (163) of the lifting platform (162) has tranverse conveying means (420) for transferring pallets raised by the lifting device (410) onto the first conveyer belt (170).

16. A device according to claim 1, wherein the receiving and delivering device (165) for the goods to be conveyed comprises at least one horizontal, laterally projecting conveyer belt (166) that is horizontally displaceable.

17. A device according to claim 1, wherein within an operating range of the conveyer belt (270), a pallet lifting device (430) and means (440) for inserting a terminal pallet (445) into an interspace between the conveyer belt (270) and a raised pallet with the goods to be conveyed, are disposed underneath the pallet.

18. A device according to claim 7, wherein the conveying platforms (163, 263) each comprise rotationally driven rollers.

19. A device for loading and unloading ships carrying bulk goods, including loaded pallets, comprising:
a gantry (20);
a vertically slewable jib (30) mounted on said gantry, said jib (30) comprising a supporting arm (130) having one end (130a) secured to said gantry (20) so as to vertically pivot around a horizontal swivel axis (132);
a stationary supporting frame (40);
a horizontally displaceable and telescoping supporting frame (50) secured in said stationary supporting frame (40), said stationary supporting frame (40) being rigidly connected to an underside (130b) of said supporting arm (130) so as to be a guide path for said displaceable supporting frame (50), said displaceable supporting frame (50) having a free front end (52);
first drive means (51) for horizontally displacing said displaceable supporting frame (50) in a telescope-like manner so that said displaceable supporting frame (50) is movable into and out of said stationary supporting frame (40);

supply and discharge belt means (70) mounted on said jib (30) for conveying goods, and having a free end, said supply and discharge belt means (70) including a first telescoping conveyer belt (170) and drive means stationarily disposed in said displaceable supporting frame (50), and a second telescoping conveyer belt (270) and drive means stationarily disposed in said stationary supporting frame (40), said first and second conveyer belts being displaceable in a telescoping manner so as to bridge a variable distance between said first and second conveyer belts, said distance being variable as a function of the displacement of said displaceable supporting frame (50) relative to said stationary supporting frame (40);

a vertical conveyer (60) supported on the free end of said supply and discharge belt means (70) and the free front end (52) of said displaceable supporting frame (50) so as to interact with said supply and discharge belt means (70);

a receiving and delivering device (165) for the goods, said receiving and delivering device (165) being carried by a lower end of said vertical conveyer (60), said vertical conveyer (60) including a carrying framework (160) that is vertically displaceable inside said displaceable supporting frame (50) within the free front end (52) of said displaceable supporting frame (50), said vertical conveyer (60) further including second drive means (161) for vertically displacing said carrying framework (160), a vertically displaceable lifting platform (162) having a conveying platform (163) arranged therein, and third drive means (164) for vertically displacing said lifting platform (162), said conveying platform (163) of said lifting platform (162) being movable to a position adjacent said receiving and delivering device (165) in dependence upon a conveyance range length when said carrying framework (160) is in a lowered position, said conveying platform (163) also being movable into a position adjacent said supply and discharge belt means (70); and means for controlling the third drive means (164) of said lifting platform (162), the drive means of said first conveyer belt (170) and the drive means of said second conveyer belt (270) so that for an unloading operation, when an item reaches the end of said first conveyer belt (170), the first conveyer belt telescopes toward said second conveyer belt while said second conveyer belt also telescopes toward said first conveyer belt so that an item is transferred from said first conveyer belt (170) to said second conveyer belt (270) and for a loading operation, said first and second conveyer belts (170) once again telescope towards one another but the rotational direction of said conveyer belts is reversed relative to the direction of rotation of said conveyer belts for the unloading operation, the rotational speed of said first and second conveyer belts (170, 270), and the speed of telescoping of the belts being set to certain values in response to movements and speed of movements of said lifting platform (162) and the distance to be traversed by said conveyer belts.

* * * * *